United States Patent Office 3,117,826
Patented Jan. 14, 1964

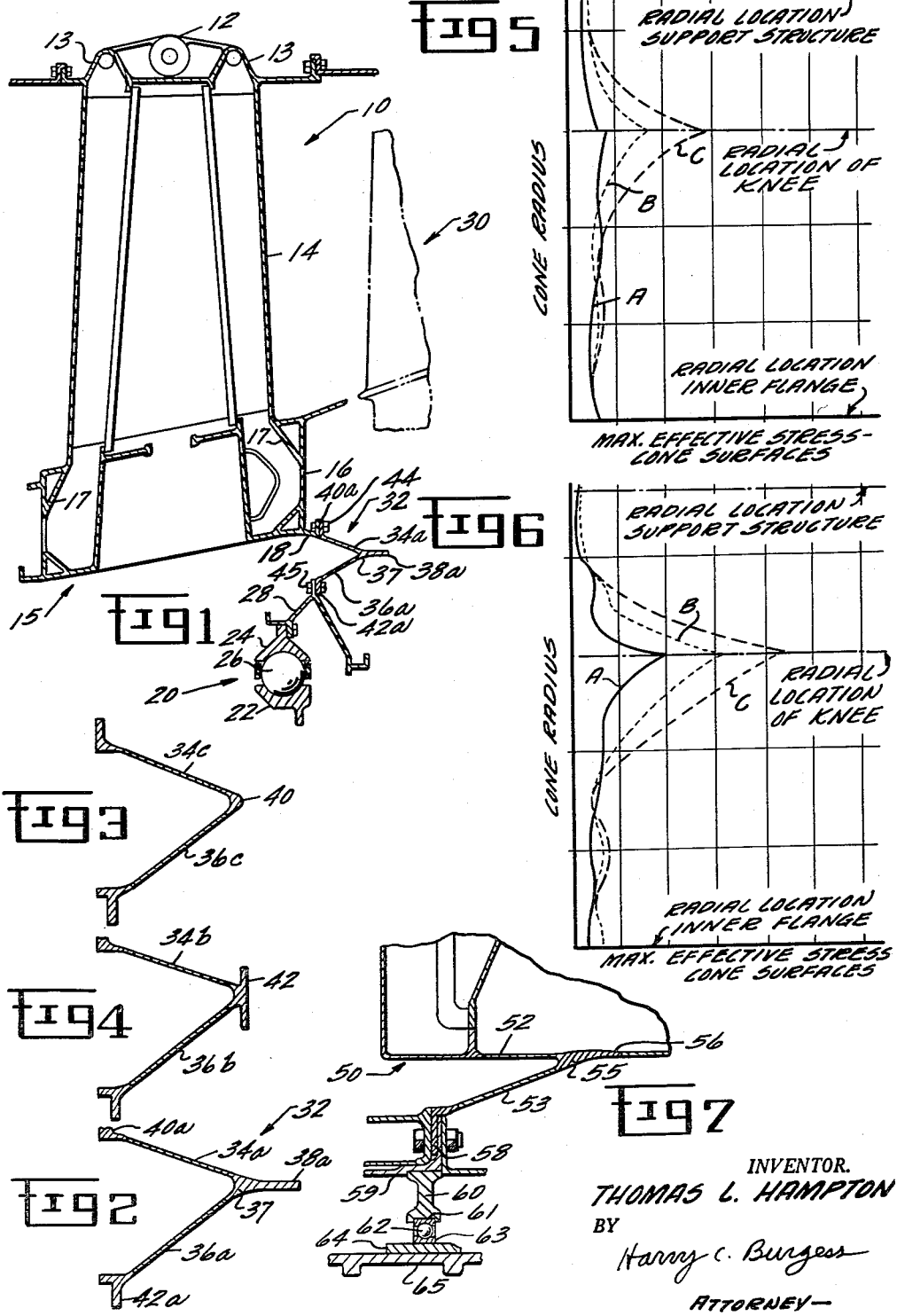

3,117,826
INTERMEDIATE ROTOR SUPPORT STRUCTURE
Thomas L. Hampton, Cincinnati, Ohio, assignor to General Electric Company, a corporation of New York
Filed Aug. 31, 1962, Ser. No. 220,791
2 Claims. (Cl. 308—26)

This invention relates to a rotor support structure and, more specifically, to a gas turbine engine rotor support structure located intermediate a main frame member and rotor bearing means.

One of the problems associated with the advent of high speed supersonic operation of jet aircraft has been how to cope with the elevated atmospheric temperatures at such speeds. One manner in which the problem manifests itself is in the need for improved structures and materials in the inlet and compressor sections of the jet engine, heretofore comparatively cool areas. A specific example of the problem occurs as a result of the primary rotor support structure, i.e., the front frame and rotor bearing support structure, being subjected to a high thermal gradient. In other words, at conditions of high-Mach operation, the front frame—including the struts and hub structure—is subject to an elevated temperature, while, at the same time, the rotor bearings and bearing sump are bathed in a "cool" lubricating liquid. Thus, the rotor support structure usually must be able to transmit very high radial and axial rotor loads and in addition, be capable of absorbing the high thermal gradient. Yet the structure must not be too heavy for modern lightweight engine designs without any sacrifice in strength and reliability.

Accordingly, it is the primary object of my invention to provide an improved rotor support structure located intermediate main rotor load-bearing elements.

A more specific object is to provide an improved rotor support structure capable of transmission of high radial and aixal loads with minimum rotor deflection, the support structure being rugged enough to withstand a high thermal gradient yet be of minimum weight with maximum reliability.

Briefly stated, one embodiment of my invention comprises a pair of axisymmetric thin-walled elements located intermediate a rotor frame member and a rotor bearing structure, the elements being joined in a superimposed relationship, one upon the other, with a stiffening member located at the juncture of the two elements.

Other objects and advantages of my invention will become more apparent when the following description is taken in conjunction with the accompanying drawings in which:

FIGURE 1 is a side elevation, in cross-section, of half of a symmetrical, axial-flow compressor front frame or support structure and rotor bearing means having the improved support structure of my invention located intermediate the frame and bearing means; and FIGURES 2-4 are cross-sectional views illustrating my improved intermediate supporting structure in comparison with similar prior known structures, FIGURES 5-6 are graphs indicating certain of the desirable effects accomplished through use of the invention in a rotor support structure; and FIGURE 7 is an alternate arrangement of the elements to that shown in FIGURE 1.

Turning now more specifically to the description, FIGURE 1 illustrates one-half of the symmetrical frame structure, indicated generally by numeral 10, in cross-section. The frame, in this case, the front frame of an axial flow compressor, includes an engine mount 12 comprising part of an outer cylindrical stiffening or double "hat" member 13 joined by a plurality of struts, one of which is shown at 14, to an inner structural supporting member or hub, indicated generally at 15. The hub is generally of box-section construction, as is well known in the art, having for example, a pair of circumferential rings 16 connected to the struts 14 through integral strut extensions 17, and including a circumferentially-extending aft flange 18. Located approximately in the plane of the aft flange and radially inwardly thereof is a bearing assembly, indicated generally at 20, comprising an inner race 22, an outer race 24, and a ball (thrust) bearing 26. The outer race is attached to and supported from the bearing sump wall structure 28 in a known manner, the inner race being affixed to and rotating with a rotor shaft (not shown) supporting a plurality of disk-mounted airfoils, one of which is indicated in phantom at 30.

My improved load-supporting and transitioning support structure, located intermediate the frame flange 18 and the bearing sump wall 28, is indicated generally at 32 in FIGURE 1. As shown in this embodiment, the support structure includes an outer frusto-conical element or shell 34a and an inner frusto-conical element or shell 36a, the elements being joined at 37 along one of their circumferential edges. Attached at, or integral with the joint 37 is a short, thick, and substantially cylindrical stiffener element 38a. The free or un-joined circumferential edges of the frusto-conical elements or shells 34a and 36a are provided with radial flanges 40a and 42a, respectively, for attachment to the aft flange 18 and the sump wall by fastening means, such as the bolt and nuts indicated at 44 and 45.

FIGURES 2-6 are herein utilized to indicate perhaps more clearly some of the problems involved in the design of an efficient, lightweight reliable load transmitting structural member, and the unique solution embodied in the present invention, one embodiment of which is shown in larger detail in FIGURE 2. As stated above, high axial and radial loads must be transmitted through the rotor bearings to the front frame and, in the case of high-Mach engine operation, there is a high thermal gradient across this structure. As is known, a relatively thin-walled, axially unrestrained frusto-conical or cylindrical shell element can absorb a large thermal gradient without encountering severe thermal stresses therein. It was believed, however, that the use of two axially-opposed (by "axially-opposed" is meant the positioning of the frusto-conical elements with their vertices pointing in opposite directions) concentric frusto-conical elements, for example, joined at their respective circumferential edges, while attractive from this standpoint, would suffer from unduly high mechanical and thermal stresses at the joint by reason of the structural discontinuity. Merely "beefing-up" the joint 40 between the pair of frusto-conical elements 34c and 36c, such as shown in FIGURE 3, would not substantially reduce such stresses. Another possible solution, that shown in FIGURE 4, wherein frusto-conical elements 34b and 36b are joined by a radially-extending disk or stiffening member 42, while suitable for all axisymmetric loads (e.g., the rotor thrust load and the thermal gradient across the front frame and bearing structure), proved inadequate for high radial loads primarily due to the existence of extreme local stresses and deflection at the junction of the thin-walled elements, or cones. Further, the radial disk was discovered to be relatively poor in its ability to withstand circumferentially-distributed moments and, thus, was unable to support the joint against rotational movement. These attempts led to the discovery of the preferred solution to the problem, i.e., the use of a relatively short (in the axial direction), flat, thick stiffener member or ring 38 in combination with the super imposed, axially-opposed, substantially concentric and circumferentially-joined, thin-walled shell (frusto-conical) elements 34a and 36a, the elements having their own axis parallel to each other and to the rotor axis, i.e., being arranged axisymmetrical in and with respect to the machine. The substantially cylindrical stiffener member 38a presented a much greater moment of inertia to the type of circumferentially-distributed moments likely to be encountered in the intermediate support structure having the configuration and location shown in FIGURES 1 and 2.

Analysis proved that the support structure of the invention was better able to withstand radially and axially applied loads in addition to being able to absorb the thermal gradient present in the inlet or front frame area of the high-Mach, lightweight type of jet engine. For example, FIGURES 5 and 6 illustrate effective stresses in the frusto-conical elements of FIGURES 1 and 2, as a function of radial distance from the joint, as compared to the intermediate support structure configurations of FIGURES 3-4. The curves labeled "A," "B," and "C," in the graphs, correspond to the pairs of elements 34a—36a, 34b—36b, and 34c—36c, respectively. It will be seen that in the case of both stresses due to axial loads (FIGURE 5) and stresses due to radial loads (FIGURE 6), the arrangement of the subject invention is for a given shell thickness superior to that of the other configurations shown in the illustrations.

An alternate embodiment of the subject invention is depicted in FIGURE 7, wherein numeral 50 indicates the inner shell, or wall of a strut or hub structure. The intermediate support members of this embodiment consist of a first element or thin-walled shell 52 integrally formed with, or attached to the shell or wall 50 and a second element or thin-walled shell 53 joined to the first element, the elements extending from a common juncture 55 of these elements with a stiffener member 56. The stiffener member or ring in this instance comprises a thickened cylindrical portion extending from the joint 55 at the same diameter as the first element 52, the opposite end of the stiffener being either free or also attached to the hub structure 50, as shown. Flange 58 is provided at the end of element 53 for attachment to suitable bearing means, such as sump wall 59, outer race support 60, outer race 61, ball bearing 62, inner race 63, and race support 64. The last named item is affixed to a rotor shaft 65 in the usual manner. In this embodiment, the elements 52 and 53 may be said to be "conically" arranged with respect to each other, being superimposed, oppositely-directed and joined at a circumferential edge, the stiffener member or ring 56 extending from the joint and providing the desirable load supporting and thermal absorption capabilities described above.

It is understood that while I have described several embodiments of my invention, that the teaching herein is not limited solely thereto and that such other embodiments as are within the skill of the art are intended to be within the scope of the claims appended hereto.

I claim:
1. A support structure for a rotor comprising:
an annular frame member;
bearing means located radially inwardly of said frame member;
a pair of substantially concentric, oppositely-directed, thin-walled frusto-conical element, said conical elements being superimposed one upon the other and connected together so as to create a circumferential joint along two the edges thereof, the remaining two edges of said frusto-conical elements being connected, respectively, to said frame member and said bearing means, said frusto-conical elements having their axis parallel to the rotor axis;
and a stiffening element comprising a substantially cylindrical shell attached at one end to said circumferential joint, said stiffening element counteracting axial, radial and circumferential mechanically and thermally induced loads imposed on said thin-walled frusto-conical elements through said frame member and said bearing means.
2. A rotor support structure for a rotor comprising:
an annular frame member;
bearing means located radially inward of said frame member;
a pair of substantially concentric, oppositely-directed, thin-walled frusto-conical elements, said frusto-conical elements being superimposed one up the other and connected together so as to create a circumferential joint along two of the edges thereof, the remaining two edges of said frusto-conical elements being connected, respectively, to said frame member and to said bearing means, said frusto-conical elements having their axis parallel to the rotor axis;
and a stiffening element comprising a substantially cylindrical shell attached at one end to said circumferential joint, the other end of said cylindrical shell being unrestrained, said stiffening element counteracting axial, radial and circumferential mechanically and thermally induced loads imposed on said thin-walled frusto-conical elements through said frame member and said bearing means.

References Cited in the file of this patent

UNITED STATES PATENTS

| | | |
|---|---|---|
| 2,676,459 | Merchant | Apr. 27, 1954 |
| 2,930,189 | Petrie | Mar. 29, 1960 |
| 2,968,922 | Gilbert | Jan. 24, 1961 |